United States Patent
Choi et al.

(10) Patent No.: US 9,100,563 B2
(45) Date of Patent: Aug. 4, 2015

(54) APPARATUS, METHOD AND COMPUTER-READABLE MEDIUM IMAGING THROUGH AT LEAST ONE APERTURE OF EACH PIXEL OF DISPLAY PANEL

(75) Inventors: Chang Kyu Choi, Seongnam-si (KR); Jae Joon Han, Seoul (KR); Byung In Yoo, Seoul (KR); Du Sik Park, Suwon-si (KR); Kwon Ju Yi, Yongin-si (KR); Sung Joo Suh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 828 days.

(21) Appl. No.: 12/926,295

(22) Filed: Nov. 8, 2010

(65) Prior Publication Data

US 2011/0221888 A1 Sep. 15, 2011

(30) Foreign Application Priority Data

Mar. 15, 2010 (KR) ........................ 10-2010-0022696

(51) Int. Cl.
| | |
|---|---|
| *H04N 5/217* | (2011.01) |
| *H04N 5/232* | (2006.01) |
| *G01C 3/08* | (2006.01) |
| *G01S 11/12* | (2006.01) |
| *G06T 5/00* | (2006.01) |
| *G06T 7/00* | (2006.01) |

(52) U.S. Cl.
CPC .................. *H04N 5/232* (2013.01); *G01C 3/08* (2013.01); *G01S 11/12* (2013.01); *G06T 5/003* (2013.01); *G06T 7/0059* (2013.01)

(58) Field of Classification Search
CPC ...................................................... H05N 5/232
USPC ........ 348/14.01–14.03, 135–137, 151, 207.1, 348/221.1, 240.99, 241
See application file for complete search history.

(56) References Cited

U.S. PATENT DOCUMENTS

| | | | |
|---|---|---|---|
| 6,452,635 B1 * | 9/2002 | Tanaka | 348/342 |
| 6,775,014 B2 * | 8/2004 | Foote et al. | 356/621 |
| 2008/0001069 A1 * | 1/2008 | Perlman et al. | 250/208.1 |

(Continued)

FOREIGN PATENT DOCUMENTS

| | | |
|---|---|---|
| KR | 10-2004-0086124 | 10/2004 |
| KR | 10-2007-0007790 | 1/2007 |

(Continued)

OTHER PUBLICATIONS

Extended European Search Report dated Jan. 22, 2014 from European Patent Application No. 11151665.4, 8 pages.

(Continued)

*Primary Examiner* — Christopher S Kelley
*Assistant Examiner* — Jonathan Messmore
(74) *Attorney, Agent, or Firm* — NSIP Law (57) ABSTRACT

Provided is an imaging apparatus, method and computer-readable medium that photographs an object through at least one aperture of each of pixel of a display panel. The imaging apparatus includes a camera unit in back of the display panel and photographs the object through the at least one aperture of each of the pixels of the display panel to enable a location of the camera unit to be the same as a location of a display unit, measures a distance to the object using a blur effect occurring when photographing through the at least one aperture of the display panel, and restores an image where the blur effect is included.

34 Claims, 7 Drawing Sheets

(56) References Cited

U.S. PATENT DOCUMENTS

| | | | |
|---|---|---|---|
| 2008/0080028 A1* | 4/2008 | Bakin et al. | 358/514 |
| 2008/0106629 A1 | 5/2008 | Kurtz et al. | |
| 2009/0160931 A1* | 6/2009 | Pockett et al. | 348/42 |
| 2010/0099984 A1* | 4/2010 | Graser | 600/425 |

FOREIGN PATENT DOCUMENTS

| | | |
|---|---|---|
| KR | 10-2008-0089251 | 10/2008 |
| KR | 10-2008-0110234 | 12/2008 |

OTHER PUBLICATIONS

Simon C. et al., "Depth Estimation Based on Thick Oriented Edges in Images", Industrial Electronics, 2004 IEEE, vol. 1, XP010874309, May 4, 2004-May 7, 2004, pp. 135-140.

Hirsch et al., "BiDI Screen: A Thin, Depth-Sensing LCD for 3D Interaction using Light Fields", ACM Transactions on Graphics (TOG) vol. 28, No. 5, XP002645234, Dec. 1, 2009, pp. 159:1-159:9.

Asada et al., "Depth from Blur Zooming", Proceedings of the Vision Interface Annual Conference, vol. VI2001, XP002717827, 2001, pp. 165-172.

* cited by examiner

FIG. 1

| APERTURE RATIO OF PIXEL | SHAPE OF PIXEL | OBTAINED IMAGE |
|---|---|---|
| WITHOUT DISPLAY PANEL | WITHOUT DISPLAY PANEL |  |
| 5% (324x72) |  |  |
| 10% (324x102) |  |  |
| 20% (324x145) |  |  |
| 30% (324x177) |  |  |
| 40% (324x205) |  | |

FIG. 2

1m (ABOUT 10 PIXEL)

2m (ABOUT 18 PIXEL)

3m (ABOUT 25 PIXEL)

APPARATUS, METHOD AND COMPUTER-READABLE MEDIUM IMAGING THROUGH AT LEAST ONE APERTURE OF EACH PIXEL OF DISPLAY PANEL

CROSS-REFERENCE TO RELATED APPLICATIONS

This application claims the benefit of Korean Patent Application No. 10-2010-0022696, filed on Mar. 15, 2010, in the Korean Intellectual Property Office, the disclosure of which is incorporated herein by reference.

BACKGROUND

1. Field

Example embodiments relate to an imaging apparatus, an imaging method and a computer-readable medium that may photograph an object to obtain an image, and more particularly, to an imaging apparatus, an imaging method and a computer-readable medium that may adjust a location of a camera unit to be the same as a location of a display unit to provide an accurate face-to-face video service in an apparatus including both a display unit and a camera unit.

2. Description of the Related Art

Technologies enabling a user to manipulate a display by touching with a bare hand, such as a touch interface, have drawn attention in industries, and there is a need for a technology that may perform natural interaction, such as proximity sensing, gesture recognition, and the like, even though the user may be far from a screen.

An interface device may not provide an accurate face-to-face video service, since a location of a camera may be different from a location of a display.

When the location of the camera is the same as the location of the display, difficulties may occur. A video call service may include a representative example of the difficulties that may occur. A terminal providing the video call service may include, in an upper side of a display, a camera obtaining an image to provide the video call service. Accordingly, when the video call service is performed, an appearance of the user may be provided, to another party, as if the user half-closes his/her eyes and the video call service may not be able to accurately show the appearance of the user. This phenomenon may get worse as the user who is using the video call gets closer to the display.

Another case where difficulties may occur is where the location of the camera is different from the location of the display, such as in a video conference.

The video conference that enables a user to feel as though the user is in the same place with another party who is far from the user using a large screen, may transmit an inaccurately captured front image of the user to the other party when the user is close to the screen.

When a camera captures a motion of the user and determines the captured motions as a gesture, such as a gesture interface, a gesture close to the display may not be sensed.

SUMMARY

The foregoing and/or other aspects are achieved by providing an imaging apparatus, and the apparatus may include a camera unit to photograph an object through at least one aperture of a pixel of a display panel, a distance measurement table to store a disparity distance generated by a blur effect generated based on zoom information of the camera unit and a distance to the object, and a distance measurement unit to determine zoom information of an image obtained through photographing the object by the camera and a disparity distance of the obtained image, and to measure the distance to the object included in the obtained image.

The disparity distance may be a distance between a sharpest edge in the obtained image and a second sharpest edge generated by the blur effect.

The distance measurement unit may measure the distance to the object for each area having the same disparity distance in the obtained image.

The imaging apparatus may further include an inverse function table to store inverse functions removing the blur effects, the inverse functions respectively corresponding to point spread functions generated based on the distance to the object, and an image restoration unit to search for an inverse function corresponding to the measured distance to the object from the inverse function table, and to restore the obtained image by applying the retrieved inverse function to the obtained image to remove the blur effect.

The image restoration unit may search for an inverse function corresponding to the measured distance for each area, and apply, to the obtained image, the inverse function retrieved for each area to remove the blur effect.

The foregoing and/or other aspects are achieved by providing an imaging apparatus, and the apparatus may include a camera unit to photograph an object through at least one aperture of a pixel of a display panel, an inverse function table to store inverse functions that remove blur effects, the inverse functions respectively corresponding to point spread functions generated based on a distance to the object, an inverse function applying unit to apply each of the inverse functions to an image obtained through photographing by a camera, a focus extractor to extract, for each image where the inverse function is applied, a focus area where the camera accurately focuses on, and an image restoration unit to replace all areas of the obtained image with the focus areas of the images where the inverse functions are respectively applied.

The apparatus may further include a distance measurement unit to determine an inverse function that is applied for each substituted focus area, to determine a distance to the object corresponding to the inverse function based on the inverse function table to measure the distance to the object for each focus area.

The foregoing and/or other aspects are achieved by providing an imaging apparatus, and the apparatus may include a camera unit to photograph an object through at least one aperture of a pixel of a display panel, a distance measurement unit to measure a distance to the object included in an image obtained through photographing by a camera, an inverse function table to store inverse functions that remove blur effects, the inverse functions respectively corresponding to point spread functions generated based on the distance to the object, and an image restoration unit to search for an inverse function corresponding to the measured distance to the object from the inverse function table, and to apply the retrieved inverse function to the obtained image to remove a blur effect.

The distance measurement unit may measure the distance to the object based on a wavelength value corresponding to a color of the object. When the object is photographed through the at least one aperture of the pixel of the display panel using a separate infrared ray, the distance measurement unit may measure the distance to the object based on a wavelength value of the infrared ray.

The foregoing and/or other aspects are achieved by providing an imaging method, and the method may include generating, by a processor, an image obtained by photographing through at least one aperture of a pixel of a display panel, determining, by the processor, zoom information associated with the obtained image and a disparity distance of the obtained image, and measuring, by the processor, a distance to the object included in the obtained image using a distance measurement table storing the disparity distance generated by a blur effect generated based on the zoom information and the distance to the object.

The disparity distance may be a distance between a sharpest edge in the obtained image and a second sharpest edge generated by the blur effect.

The method may further include searching for an inverse function corresponding to the measured distance to the object from the inverse function table storing inverse functions that remove blur effects, the inverse functions respectively corresponding to point spread functions generated based on the distance to the object, and restoring the obtained image by applying the retrieved inverse function to the obtained image to remove the blur effect.

The measuring may measure the distance to the object for each area having the same disparity distance in the obtained image.

The method may further include searching for an inverse function corresponding to the measured distance for each area in the obtained image from the inverse function table storing inverse functions that remove the blur effects, the inverse functions respectively corresponding to the point spread functions generated based on the distance to the object, and restoring the obtained image by applying, to the obtained image, the inverse function retrieved for each area to remove the blur effect.

The foregoing and/or other aspects are achieved by providing an imaging method, and the method may include generating, by a processor, an image obtained by photographing through at least one aperture of a pixel of a display panel, applying by the processor, to the obtained image, each of inverse functions that remove blur effects, the inverse functions respectively corresponding to point spread functions generated based on a distance to an object, extracting, by the processor, a focus area that a camera appropriately focuses on for each image where the inverse function is applied, and restoring, by the processor, the obtained image by replacing all areas of the obtained area with the focus areas of images where the inverse functions are respectively applied.

The method may further include determining an inverse function that is applied for each substituted focus area, and determining a distance to the object corresponding to the inverse function to measure a distance to the object for each focus area.

The foregoing and/or other aspects are achieved by providing an imaging method, and the method may include generating, by a processor, an image obtained by photographing through at least one aperture of a pixel of a display panel, measuring, by the processor, a distance to an object included in the obtained image, searching, by a processor, for an inverse function corresponding to the measured distance to the object from the inverse function table storing inverse functions that remove blur effects, the inverse functions respectively corresponding to point spread functions generated based on the distance to the object, and restoring, by the processor, the obtained image by applying the retrieved inverse function to the obtained image to remove a blur effect.

The measuring may measure the distance to the object based on a wavelength value corresponding to a color of the object or a wavelength value of an infrared ray used as an external light source. When the object is photographed through the at least one aperture of the pixel of the display panel using a separate infrared ray, the measuring may measure the distance to the object based on a wavelength value of the infrared ray.

According to another aspect of one or more embodiments, there is provided at least one computer readable medium including computer readable instructions that control at least one processor to implement methods of one or more embodiments.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. Embodiments are described below to explain the present disclosure by referring to the figures.

An imaging apparatus and an imaging method may utilize a camera unit located in back of a display panel to photograph an object through at least one aperture of each pixel of a display panel, may adjust a location of the camera unit to be the same as a location of a display unit, may measure a distance to the object using a blur effect occurring when photographing through the at least one aperture of the display panel, and may restore an image where the blur effect is included.

Figure 1:
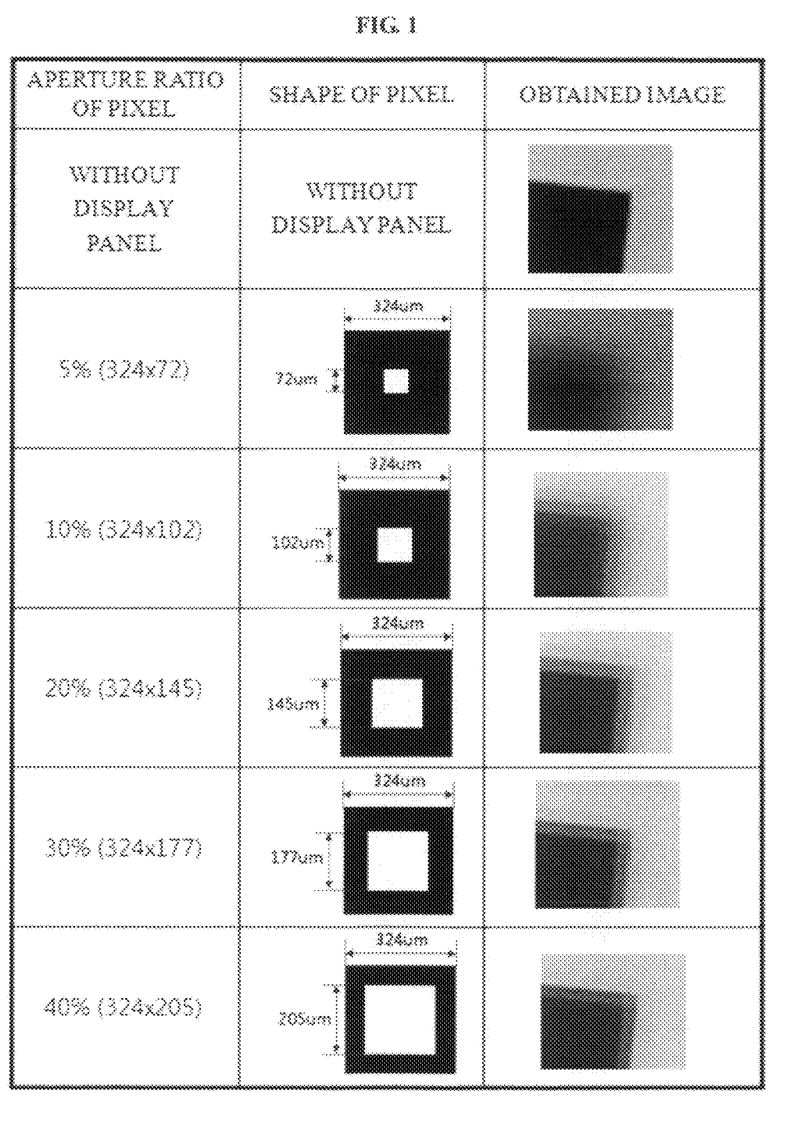
FIG. 1 is a diagram illustrating an image obtained by photographing an object through at least one aperture of a display panel based on an aperture ratio.

The camera unit may be located in back of the display panel, such as a liquid crystal display (LCD) panel and an organic light emitting diodes (OLED) panel, and the display panel may structurally include at least one aperture. The camera unit may photograph the object through the at least one aperture of the display panel, and the image obtained by photographing may include a different blur effect based on a size of the at least one aperture, as illustrated in FIG. 1.

A blur may be classified into a blur due to a geometric effect and a blur due to a diffraction effect. The blur due to the geometric effect may be expressed by Equation 1.

$$B_G = a(d_o + d_i)/d_o \quad \text{[Equation 1]}$$

In Equation 1, $B_G$ denotes the blur due to the geometric effect, a denotes a diameter of an aperture, $d_o$ denotes a distance between the aperture and the object, and $d_i$ denotes a distance between the aperture and an image sensor.

The blur due to the diffraction effect may be expressed according to a wavelength ($\lambda$) of light as given in Equation 2.

$$B_D = 2.44 \lambda d_i / a \quad \text{[Equation 2]}$$

In Equation 2, $B_D$ denotes a blur due to the diffraction effect, $\lambda$ denotes a wavelength of a light, a denotes a size of the aperture, and $d_i$ denotes a distance between the aperture and the image sensor.

A size of a total blur may be expressed by a sum of the two effects, as given in Equation 3.

$$B = B_G + B_D = a(d_o + d_i)/d_o + 2.44 \lambda d_i / a \quad \text{[Equation 3]}$$

In Equation 3, B denotes the size of the total blur, $B_G$ denotes a blur due to the geometric effect, $B_D$ denotes a blur due to the diffraction effect, a denotes the size of the aperture, $\lambda$ denotes a wavelength of a light, $d_o$ denotes the distance between the aperture and the object, and $d_i$ denotes the distance between the aperture and the image sensor.

FIG. 1 illustrates an image obtained by photographing an object through at least one aperture of a display panel based on at least one aperture ratio. Referring to FIG. 1, when a size of the at least one aperture is smaller, a diffraction is larger.

Figure 2:
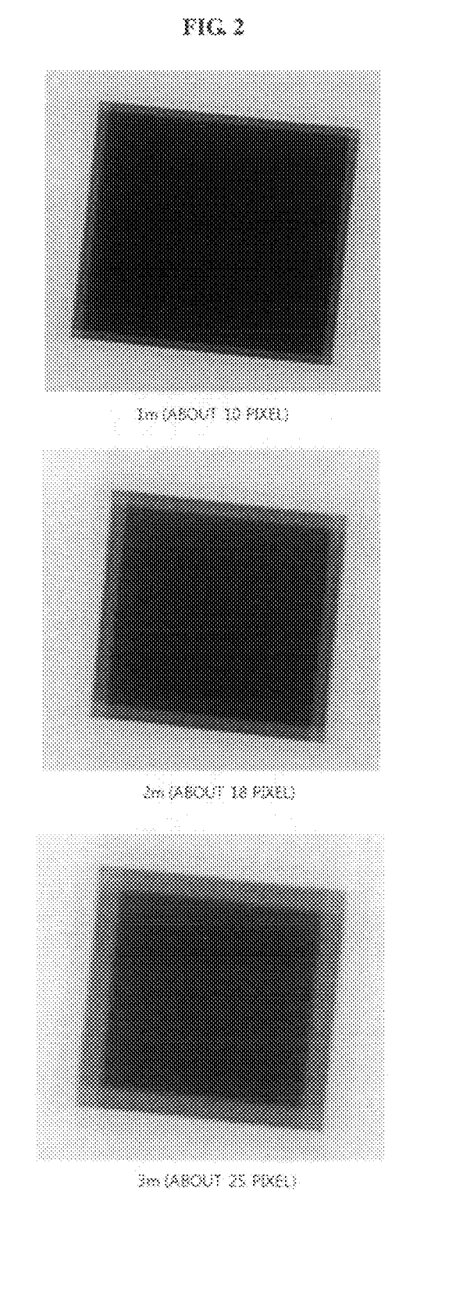
FIG. 2 is a diagram illustrating an image obtained by photographing through at least one aperture based on a distance to an object.

The blur effect that occurs when the object is photographed through the at least one aperture of the display panel may be different responsive to a distance between the object and the at least one aperture and a distance between the at least one aperture and an image sensor, in addition to a size of the at least one aperture, as illustrated in FIG. 2.

FIG. 2 illustrates an image obtained by photographing through at least one aperture based on a distance to an object. Referring to FIG. 2, a disparity distance of the image which is generated due to a blur effect may increase responsive to the distance to the object. In this case, the disparity distance generated due to the blur effect may be a distance between a sharpest edge in the obtained image and a second sharpest edge generated by the blur effect.

Referring to FIG. 2, when the distance to the object is one meter, the disparity distance may be about 10 pixels. When the distance to the object is two meters, the disparity distance may be about 18 pixels. When the distance to the object is three meters, the disparity distance may be about 25 pixels.

Figure 3:
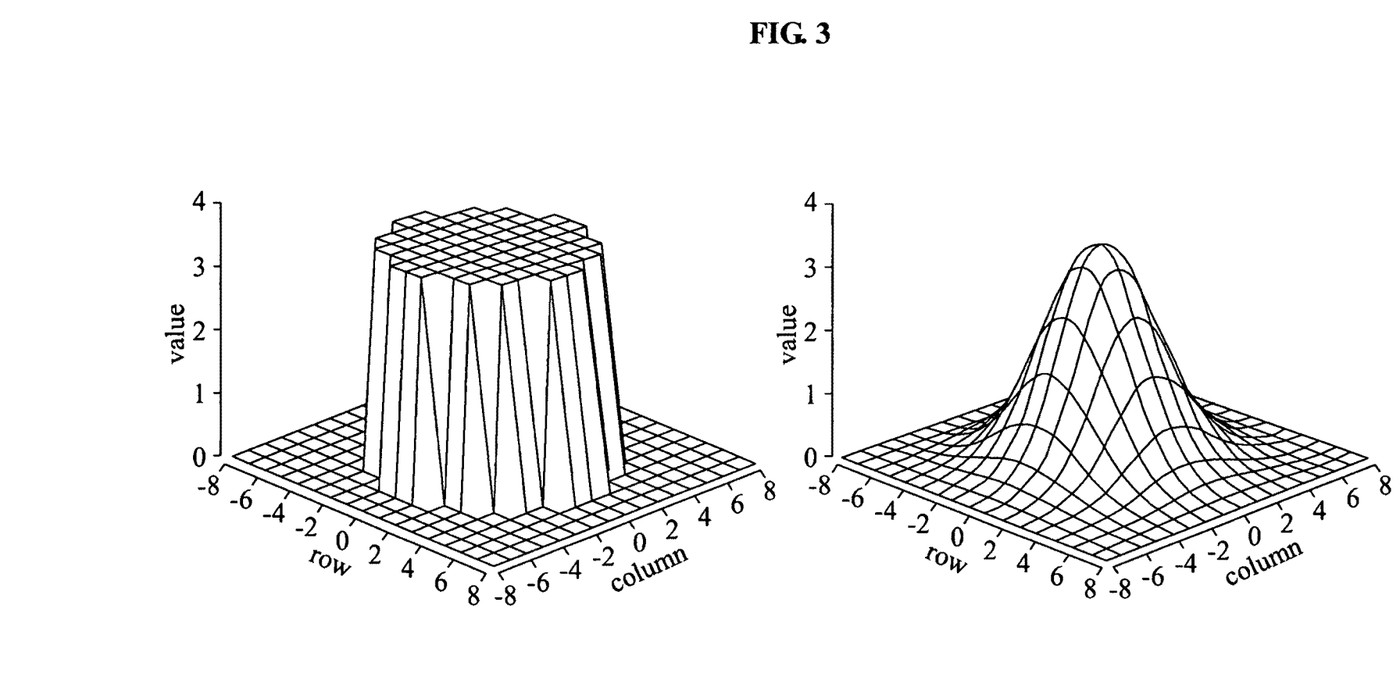
FIG. 3 is a diagram illustrating an example of a point spread function generated when an object is photographed through at least one aperture of a display panel.

The blur effect occurring when the object is photographed by the display panel having a plurality of apertures may be expressed by a point spread function as illustrated in FIG. 3. FIG. 3 illustrates an example of a point spread function generated when an object is photographed through at least one aperture of a display panel. Pillbox Function is a point spread function indicating a blur due to a geometric effect and Gaussian is a point spread function indicating a blur further including a diffraction effect.

Figure 4:
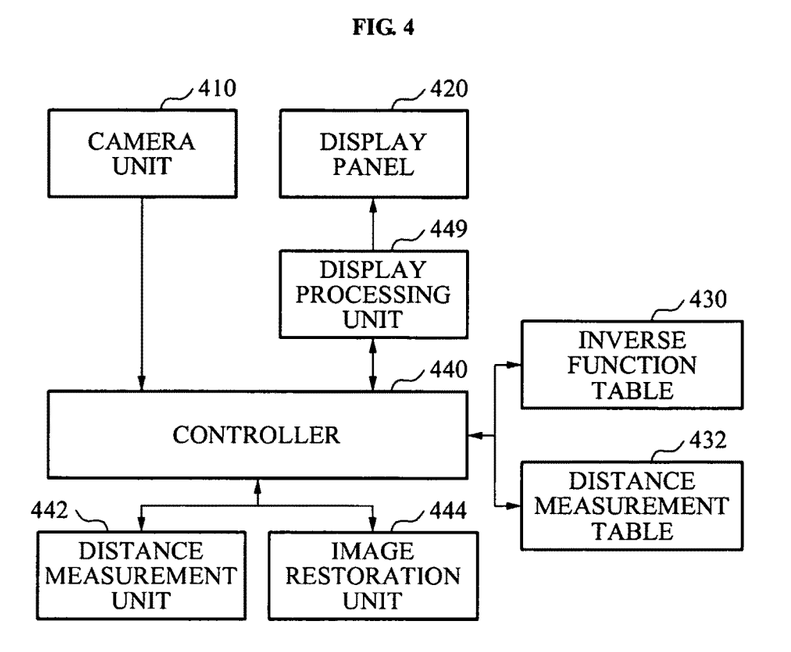
FIG. 4 is a diagram illustrating an example of an imaging apparatus that photographs an object through at least one aperture of each pixel of a display panel.

FIG. 4 illustrates an example of an imaging apparatus that photographs an object through at least one aperture of each pixel of a display panel. Referring to FIG. 4, the imaging apparatus may include a camera unit 410, a display panel 420, an inverse function table 430, a distance measurement table 432, a controller 440, a distance measurement unit 442, an image restoration unit 444, and a display processing unit 449.

The display panel 420 may be a panel, such as a liquid crystal display (LCD) panel and an organic light emitting diode (OLED) panel, including pixels structurally including apertures.

The display processing unit 449 may control the display panel 420 and may output an image through the display panel 420.

The camera unit 410 may be located in back of the display panel 420 and may obtain the image of the object through at least one aperture of each of the pixels of the display panel 420. In this case, the camera unit 410 may be configured by only an image sensor.

The inverse function table 430 may store inverse functions of point spread functions that remove blur effects, the inverse functions respectively corresponding to point spread functions generated based on a distance to the object.

The distance measurement table 432 may store a distance to the photographed object corresponding to a disparity distance generated by zoom information associated with a zoom level of a camera unit and a blur effect. The zoom information may be a standard to indicate a level of zoom used for photographing.

The distance measurement table 432 may be as given in Table 1.

TABLE 1

| Distance | Zoom Level | | |
|---|---|---|---|
| | 1 | 2 | 3 |
| 1 m | 10 pixels | 12 pixels | 14 pixels |
| 2 m | 16 pixels | 18 pixels | 20 pixels |
| 3 m | 21 pixels | 23 pixels | 25 pixels |

The distance measurement unit 442 may determine zoom information of the obtained image and a disparity distance of the obtained image, and may measure the distance to the object included in the obtained image using the distance measurement table 432. When the distance measurement table does not include the disparity distance, the distance measurement unit 442 may measure the distance to the object based on an interpolation scheme using approximate disparity distances included in the distance measurement table 432. In this case, the disparity distance may be a distance between a sharpest edge of the object in the obtained image and a second sharpest edge generated by a blur effect.

The distance measurement unit 442 may measure the distance to the object for each area having the same disparity distance in the obtained image.

The distance measurement unit 442 may measure the distance to the object using various methods. When a size of the blur is determined, the distance to the object may be measured based on a wavelength value corresponding to a color of the object or based on a wavelength value corresponding to an infrared ray used as a separate light source.

$$d_o = a^2 d_i / (aB - 2.44 \lambda d_i - a^2) \quad \text{[Equation 4]}$$

In Equation 4, $d_o$ denotes a distance between an aperture and the object, a denotes a size of the aperture, $d_i$ denotes a distance between the aperture and an image sensor, B denotes a size of a total blur, the size being a sum of a blur due to a geometric effect and a blur due to a diffraction effect, and $\lambda$ denotes a wavelength value corresponding to a color of an area where the distance is measured.

The image restoration unit 444 may search for an inverse function corresponding to the measured distance to the object from the inverse function table 430, may apply the retrieved inverse function to the obtained image to remove the blur effect, and may restore the image.

The obtained image including the blur effect may be expressed by Equation 5.

$$I'(x,y)=I(x,y)*H(x,y) \quad \text{[Equation 5]}$$

In Equation 5, I'(x, y) denotes the obtained image including the blur effect, I(x, y) denotes an original image where the blur effect is not included, and H(x, y) denotes a point spread function. When the inverse function is applied to the obtained image including the blur effect as given in Equation 6, the blur effect may be removed from the obtained image.

$$I(x,y)=I'(x,y)H^{-1}(x,y) \quad \text{[Equation 6]}$$

In Equation 6, I(x, y) denotes the original image where the blur effect is removed, I'(x, y) denotes the obtained image including the blur effect, and $H^{-1}(x, y)$ denotes an inverse function of the point spread function.

The image restoration unit 444 may search for an inverse function corresponding to the measured distance for each area of the obtained image, from the inverse function table 430, may apply the retrieved inverse function to the obtained image to remove the blur effect, and may restore the image.

The controller 440 may generally control the imaging apparatus, and may perform a function of the distance measurement unit 442, a function of the image restoration unit 444, and a function of the display processing unit 449. The described elements are separately illustrated to separately describe each function. Accordingly, when a product is actually embodied, the controller 440 may be configured to perform all functions of the elements or may be configured to perform several functions of the elements.

Figure 5:
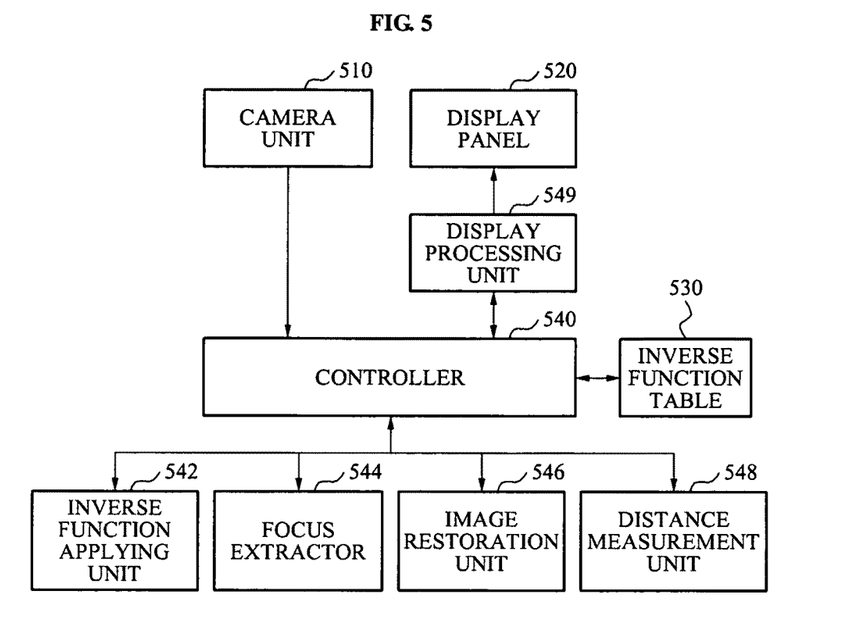
FIG. 5 is a diagram illustrating another example of an imaging apparatus that photographs an object through at least one aperture of each pixel of a display panel.

FIG. 5 illustrates example embodiments, including another example of an imaging apparatus that may photograph an object through at least one aperture of each pixel of a display panel. Referring to FIG. 5, the imaging apparatus may include a camera unit 510, a display panel 520, an inverse function table 530, a controller 540, an inverse function applying unit 542, a focus extractor 544, an image restoration unit 546, a distance measurement unit 548, and a display processing unit 549.

The display panel 520 may be a panel, such as an LCD panel and an OLED panel, including pixels structurally including apertures.

The display processing unit 549 may control the display panel 520 and output an image through the display panel 520.

The camera unit 510 may be located in back of the display panel 520 and may obtain the image of the object through the at least one aperture of each of the pixels of the display panel 520. In this case, the camera unit 510 may be configured by only an image sensor.

The inverse function table 530 may store inverse functions of point spread functions that remove blur effects, the inverse functions respectively corresponding to the point spread functions generated based on a distance to the object.

The inverse function applying unit 542 may apply, to the obtained image, each of the inverse functions included in the inverse function table 530.

The focus extractor 544 may extract a focus area that the camera accurately focuses on from each image where an inverse function is applied.

The image restoration unit 546 may replace all areas of the obtained image with focus areas of images where the inverse functions are respectively applied to remove the blur effect, and may restore the image.

The distance measurement unit 548 may determine an inverse function for each substituted focus area, and may determine a distance to the object, the distance corresponding to the inverse function, to measure the distance to the object for each focus area.

The controller 540 may generally control the imaging apparatus, and may perform a function of the inverse function applying unit 542, a focus extractor 544, an image restoration unit 546, a distance measurement unit 548, and a display processing unit 549. The described elements are separately illustrated to separately describe each function. Accordingly, when a product is actually embodied, the controller 540 may be configured to perform all functions of the elements or may be configured to perform several functions of the elements.

A method of photographing an object through at least one aperture of each pixel of a display panel to obtain an image, and restoring the obtained image is described with reference to the drawings.

Figure 6:
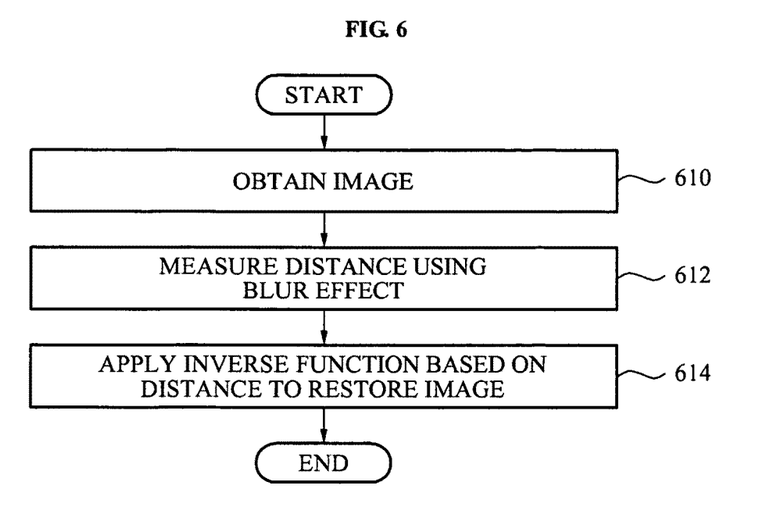
FIG. 6 is a flowchart illustrating an example of an imaging method that photographs an object through at least one aperture of each pixel of a display panel.

FIG. 6 illustrates example embodiments including an example of an imaging method that photographs an object through at least one aperture of each pixel of a display panel. Referring to FIG. 6, an imaging apparatus may obtain an image of the object through at least one aperture of a pixel in back of the display panel in operation 610.

The imaging apparatus measures a distance to the object included in the obtained image using a blur effect in operation 612. To measure the distance to the object, zoom information and a disparity distance of the obtained image are determined, and the distance to the object included in the obtained image may be measured using a distance measurement table. In this case, the distance to the object may be measured for each area having the same disparity distance in the obtained image.

As another example method of measuring the distance to the object, the distance measurement unit 442 may measure the distance based on Equation 4.

The imaging apparatus may search for an inverse function corresponding to the measured distance to the object from an inverse function table storing inverse functions that remove blur effects, the inverse functions respectively corresponding to point spread functions generated based on the distance to the object in operation 614, may apply the retrieved inverse function to the obtained image to remove the blur effect, and may restore the image.

Figure 7:
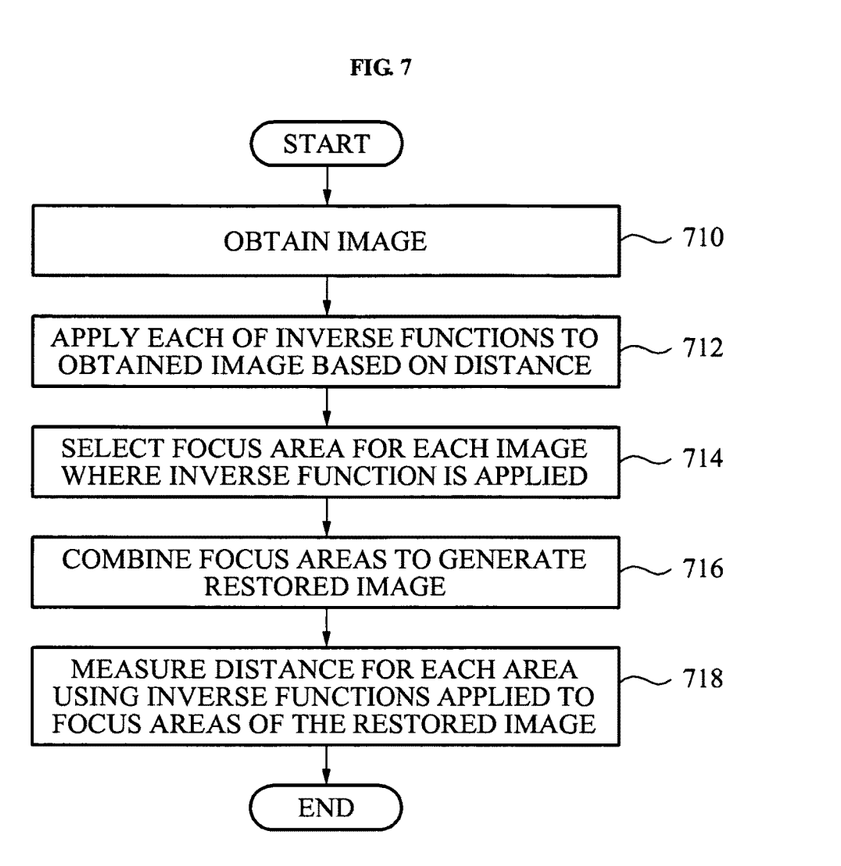
FIG. 7 is a flowchart illustrating another example of an imaging method that photographs an object through at least one aperture of each pixel of a display panel.

FIG. 7 illustrates example embodiments including another example of an imaging method including photographing an object through at least one aperture of each pixel of a display panel. Referring to FIG. 7, the imaging apparatus obtains an image of the object through at least one aperture of a pixel in back of the display panel in operation 710.

In operation 712, the imaging apparatus applies, to the obtained image, each of inverse functions that remove blur effects, the inverse functions respectively corresponding to point spread functions generated based on a distance to the object.

In operation 714, the imaging apparatus extracts a focus area for each image that a camera accurately focuses on, and applies the inverse functions.

In operation 716, the imaging apparatus replaces all areas of the obtained image with focus areas of the images where the inverse functions are respectively applied to restore the image.

In operation 718, the imaging apparatus determines an inverse function applied for each focus area to determine the distance to the object corresponding to the inverse function, and may measure the distance to the object for each focus area.

According to example embodiments, there is provided an imaging apparatus that photographs an object through at least one aperture of each pixel of a display panel. A camera unit is located in back of the display panel and may accurately photograph a front of a face of a user when providing a face-to-face video service, such as a video call. A distance to the object may be measured using a blur effect.

The above-described embodiments may be recorded in non-transitory computer-readable media including program instructions to implement various operations embodied by a computer. The media may also include, alone or in combination with the program instructions, data files, data structures, and the like. Examples of computer-readable media (computer-readable storage devices) include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may be a plurality of computer-readable storage devices in a distributed network, so that the program instructions are stored in the plurality of computer-readable storage devices and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although embodiments have been shown and described, it should be appreciated by those skilled in the art that changes may be made in these embodiments without departing from the principles and spirit of the disclosure, the scope of which is defined by the claims and their equivalents.

What is claimed is:

1. An imaging apparatus, the apparatus comprising:
an image sensor to photograph an object through at least one aperture of a pixel of a display panel;
a distance measurement table to store a disparity distance generated by a blur effect generated based on zoom information of the image sensor and a distance to the object; and
a distance measurement unit to determine zoom information of an image obtained through photographing the object by the image sensor and at least one disparity distance of at least one area of the obtained image, and to measure the distance to the object included in the obtained image using the distance measurement table,
wherein the disparity distance is a distance between two edges having different sharpnesses in the obtained image.

2. The imaging apparatus of claim 1, wherein the disparity distance is a distance between a sharpest edge in the obtained image and a second sharpest edge generated by the blur effect.

3. The imaging apparatus of claim 1, wherein the distance measurement unit measures the distance to the object for each area having the same disparity distance in the obtained image.

4. The imaging apparatus of claim 1, further comprising:
an inverse function table to store inverse functions removing blur effects, the inverse functions respectively corresponding to point spread functions generated based on the distance to the object; and
an image restoration unit to search for an inverse function corresponding to the measured distance to the object from the inverse function table, and to restore the obtained image by applying the retrieved inverse function to the obtained image to remove the blur effect.

5. The imaging apparatus of claim 4, wherein the image restoration unit determines the measured distance to the object for each area of the obtained image, searches for an inverse function corresponding to the measured distance for each area, and applies, to the obtained image, the inverse function retrieved for each area to remove the blur effect.

6. An imaging apparatus, the apparatus comprising:
a camera unit to photograph an object through at least one aperture of a pixel of a display panel;
an inverse function table to store inverse functions that remove blur effects, the inverse functions respectively corresponding to point spread functions generated based on a distance to the object;
an inverse function applying unit to apply each of the inverse functions to an image obtained through photographing by the camera;
a focus extractor to extract, for each image where the inverse function is applied, a focus area where the camera accurately focuses on; and
an image restoration unit to replace all areas of the obtained image with the focus areas of the images where the inverse functions are respectively applied.

7. The apparatus of claim 6, further comprising:
a distance measurement unit to determine an inverse function that is applied to the replaced areas of the obtained image, and to determine a distance to the object corresponding to the inverse function based on the inverse function table to measure the distance to the object for each focus area.

8. An imaging apparatus, the apparatus comprising:
a camera unit to photograph an object through at least one aperture of a pixel of a display panel;
a distance measurement unit to measure a distance to the object included in an image obtained through photographing by the camera;
an inverse function table to store inverse functions that remove blur effects, the inverse functions respectively corresponding to point spread functions generated based on the distance to the object; and
an image restoration unit to search for an inverse function corresponding to the measured distance to the object from the inverse function table, and to apply the retrieved inverse function to the obtained image to remove a blur effect.

9. The apparatus of claim 8, wherein the distance measurement unit measures the distance to the object based on a wavelength value corresponding to a color of the object, or based on a wavelength value of an infrared ray used as an external light source.

10. An imaging method, the method comprising:
generating, by a processor, an image obtained by photographing through at least one aperture of a pixel of a display panel;
determining, by the processor, zoom information associated with the obtained image and at least one disparity distance of at least one area of the obtained image; and
measuring, by the processor, a distance to the object included in the obtained image using a distance measurement table storing the disparity distance generated by a blur effect generated based on the zoom information and the distance to the object,
wherein the disparity distance is a distance between two edges having different sharpnesses in the obtained image.

11. The method of claim 10, wherein the disparity distance is a distance between a sharpest edge in the obtained image and a second sharpest edge generated by the blur effect.

12. The method of claim 10, further comprising:
searching for an inverse function corresponding to the measured distance to the object from an inverse function table storing inverse functions that remove blur effects, the inverse functions respectively corresponding to point spread functions generated based on the distance to the object; and
restoring the obtained image by applying the retrieved inverse function to the obtained image to remove the blur effect.

13. The method of claim 10, wherein the measuring measures the distance to the object for each area having the same disparity distance in the obtained image.

14. The method of claim 13, further comprising:
searching for an inverse function corresponding to the measured distance for each area in the obtained image from an inverse function table storing inverse functions that remove the blur effects, the inverse functions respectively corresponding to the point spread functions generated based on the distance to the object; and
restoring the obtained image by applying, to the obtained image, the inverse function retrieved for the area to remove the blur effect.

15. An imaging method, the method comprising:
generating, by a processor, an image obtained by photographing through at least one aperture of a pixel of a display panel;
applying, by the processor, to the obtained image, each of inverse functions that remove blur effects, the inverse functions respectively corresponding to point spread functions generated based on a distance to an object;
extracting, by the processor, a focus area that a camera appropriately focuses on for each image where the inverse function is applied; and
restoring, by the processor, the obtained image by replacing all areas of the obtained area with the focus areas of images where the inverse functions are respectively applied.

16. The method of claim 15, further comprising:
determining an inverse function that is applied for the focus areas, and determining a distance to the object corresponding to the inverse function to measure a distance to the object for each focus area.

17. An imaging method, the method comprising:
generating, by a processor, an image obtained by photographing through at least one aperture of a pixel of a display panel;
measuring, by the processor, a distance to an object included in the obtained image;
searching, by the processor, for an inverse function corresponding to the measured distance to the object from an inverse function table storing inverse functions that remove blur effects, the inverse functions respectively corresponding to point spread functions generated based on the distance to the object; and
restoring, by the processor, the obtained image by applying the retrieved inverse function to the obtained image to remove a blur effect.

18. The method of claim 17, wherein the measuring measures the distance to the object based on a wavelength value corresponding to a color of the object or a wavelength value of an infrared ray used as an external light source.

19. At least one non-transitory computer readable medium comprising computer readable instructions that control at least one processor to implement a method, comprising:
generating an image obtained by photographing through at least one aperture of a pixel of a display panel;
determining zoom information associated with the obtained image and at least one disparity distance of at least one area of the obtained image; and
measuring a distance to the object included in the obtained image using a distance measurement table storing the disparity distance generated by a blur effect generated based on the zoom information and the distance to the object,
wherein the disparity distance is a distance between two edges having different sharpnesses in the obtained image.

20. The at least one non-transitory computer readable medium of claim 19, wherein the disparity distance is a distance between a sharpest edge in the obtained image and a second sharpest edge generated by the blur effect.

21. The at least one non-transitory computer readable medium of claim 19, further comprising:
searching for an inverse function corresponding to the measured distance to the object from an inverse function table storing inverse functions that remove blur effects, the inverse functions respectively corresponding to point spread functions generated based on the distance to the object; and
restoring the obtained image by applying the retrieved inverse function to the obtained image to remove the blur effect.

22. The at least one non-transitory computer readable medium of claim 19, wherein the measuring measures the distance to the object for each area having the same disparity distance in the obtained image.

23. The at least one non-transitory computer readable medium of claim 22, further comprising:
searching for an inverse function corresponding to the measured distance for each area in the obtained image from an inverse function table storing inverse functions that remove the blur effects, the inverse functions respectively corresponding to the point spread functions generated based on the distance to the object; and
restoring the obtained image by applying, to the obtained image, the inverse function retrieved for the area to remove the blur effect.

24. At least one non-transitory computer readable medium comprising computer readable instructions that control at least one processor to implement a method, comprising:
generating an image obtained by photographing through at least one aperture of a pixel of a display panel;
applying to the obtained image, each of inverse functions that remove blur effects, the inverse functions respectively corresponding to point spread functions generated based on a distance to an object;
extracting a focus area that a camera appropriately focuses on for each image where the inverse function is applied; and
restoring the obtained image by replacing all areas of the obtained area with the focus areas of images that the inverse functions are respectively applied.

25. The at least one non-transitory computer readable medium of claim 24, further comprising determining an inverse function that is applied for the focus areas, and determining a distance to the object corresponding to the inverse function to measure a distance to the object for each focus area.

26. At least one non-transitory computer readable medium comprising computer readable instructions that control at least one processor to implement an imaging method, comprising:

generating an image obtained by photographing through at least one aperture of a pixel of a display panel;

measuring a distance to an object included in the obtained image;

searching for an inverse function corresponding to the measured distance to the object from an inverse function table storing inverse functions that remove blur effects, the inverse functions respectively corresponding to point spread functions generated based on the distance to the object; and     restoring the obtained image by applying the retrieved inverse function to the obtained image to remove a blur effect.

27. The at least one non-transitory computer readable medium of claim 26, wherein the measuring measures the distance to the object based on a wavelength value corresponding to a color of the object or a wavelength value of an infrared ray used as an external light source.

28. A method, comprising:

capturing an image using a camera located on a rear of a display panel, the image captured through at least one aperture of the display panel;

determining, by a processor, a distance to an object responsive to blurring of the object in the image caused by a geometric effect and a diffraction effect; and     removing, by the processor, the blurring from the image, wherein a degree of the blurring corresponds to a distance between two edges having different sharpnesses in the captured image.

29. A method, comprising:

capturing an image using a camera located on a rear of a display panel by each pixel of a display panel, each pixel having at least one aperture;

determining, by a processor, a distance to an object responsive to blurring of the object in the image caused by a geometric effect and a diffraction effect; and     removing, by the processor, the blurring from the image by applying an inverse function from an inverse function table to at least one focus area in the image.

30. The method of claim 29, wherein the distance to the object is measured for the at least one focus area in the image.

31. The method of claim 29, wherein the distance to the object is determined based on a wavelength value corresponding to a color of the object or a wavelength value of an infrared ray used as an external light source.

32. The method of claim 29, wherein the distance to the object is determined by determining a distance between a first sharpest edge in the image and a second sharpest edge in the image.

33. The method of claim 29, wherein the captured image is provided to a video call service.

34. The method of claim 29, wherein gestures made by a user are determined from the captured image after removing the blurring from the image.

* * * * *